Oct. 19, 1965   G. G. LANDBERG ETAL   3,213,304

FAN-COOLED ELECTRIC MOTOR

Filed Nov. 6, 1962

Inventors
George G. Landberg
Paul W. Wagner
by Robert B. Benson
Attorney

United States Patent Office 3,213,304
Patented Oct. 19, 1965

3,213,304
FAN-COOLED ELECTRIC MOTOR
George G. Landberg and Paul D. Wagner, Cincinnati, Ohio, assignors to Allis-Chalmers Manufacturing Company, Milwaukee, Wis.
Filed Nov. 6, 1962, Ser. No. 235,618
5 Claims. (Cl. 310—53)

This invention relates generally to a fan-cooled electric motor. More specifically this invention relates to electric motors having fans with adjustable blades so as to provide a maximum efficiency and cooling effect regardless of the direction of rotation of the rotor.

It is common to cool electric motors by the use of a fan connected to the rotor or shaft of the motor. It has been known for many years that the best results, as far as efficiency, low noise and cooling of the motor, can be obtained by using a fan with backwardly inclined blades. When using cast fan blades, the manufacturer has to know in advance the direction of rotation of the motor rotor in order to take advantage of the backwardly inclined blades. This is not practical in a mass production operation. As a result, most fan cooled motors come equipped with a fan which is integrally connected to the rotor or affixed to the motor shaft and has blades which are substantially radial.

This invention overcomes the problems mentioned above by providing a fan on the rotor that has pivotally mounted blades which automatically assume the preferred backwardly inclined position regardless of the direction of rotation of the motor rotor. This is accomplished by pivoting the blades and balancing them in such a manner that upon rotation the motion of the rotor plus the air acting on the blades causes them to pivot until they are engaged by stops located on the back plate of the fan. The stops are positioned to hold the blades in the preferred backwardly inclined position for the direction of rotation of the fan. This arrangement allows the designer to take advantage of the best aerodynamic configuration of the blade to further improve the efficiency and cooling of the motor.

Therefore, it is the object of this invention to provide a new and improved dynamoelectric machine.

Another object of this invention is to provide a dynamoelectric machine that is more efficient and has better cooling.

Another object of this invention is to provide a dynamoelectric machine that has an inherently lower noise level.

Another object of this invention is to provide a new and improved bi-directional electric motor.

Other objects and advantages of this invention will be apparent from the following description when read in connection with the accompanying drawings in which.

Figure 1:
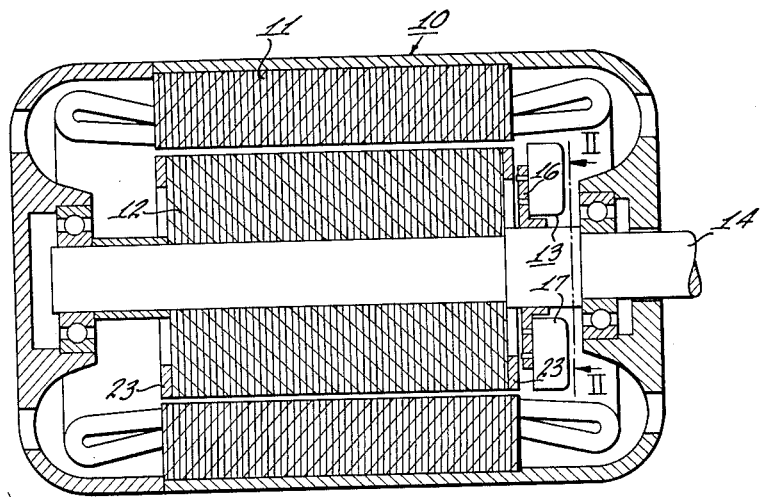
FIG. 1 is a cross sectional view of an electric motor embodying the fan of this invention.

Referring more particularly to the drawings by characters of reference, the invention is shown in combination with an induction motor. The motor 10 has a conventional stator 11 and rotor 12 with a fan 13 mounted on the rotor shaft 14 at one end of the rotor.

Figure 2:
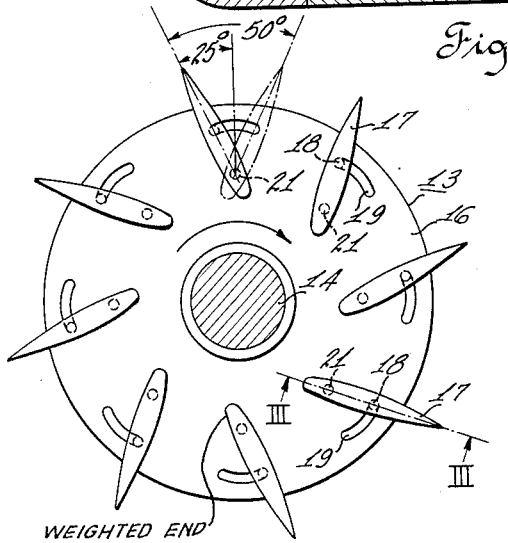
FIG. 2 is a cross sectional view of the motor of FIG. 1 taken along the line II—II showing the fans in position for clockwise rotation of the rotor.
Figure 3:
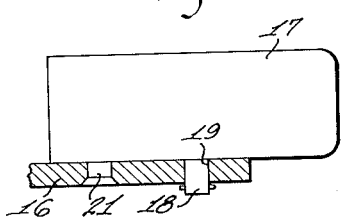
FIG. 3 is an enlarged cross sectional view taken along the line III—III of FIG. 2 showing a fan blade and a portion of backing plate of the fan of this invention.

The fan 13 comprises a backing plate 16 and a plurality of arcuately spaced fan blades 17 pivotally mounted on the backing plate. As shown in FIGS. 1 through 3, the fan blades are pivotally connected to the backing plate 16 at a point about three-quarters of the distance from the outer tip of the blade. Each blade 17 has a pin 18 between the pivot point and the outer tip that extends through a slot 19 in the backing plate. This slot 19 extends through an arc of approximately 50° so that when the blade pin 18 engages the end of the slot, the blades 17 automatically form a 25° angle with the radius of the plate 16 that extends through the pivot point 21 of the blade. Because the blades will always pivot away from the direction of rotation of the rotor, they will always assume a rearwardly inclined position relative to a radius of the fan backing plate through their pivot point.

In order to assure that the blades will pivot to the proper position, two conditions must be met. The total gas force on the fan blade radially outward from the pivot point must exceed the total gas force on the fan blade radially inward from the pivot point; and the total centrifugal force of the blade radially inward from the pivot point must exceed the total centrifugal force of the blade outward from the pivot point. In the arrangement shown in FIGS. 1–3, the pressure of the air acting on the blade will exert a greater force on the larger surface area radially outward of the pivot point thereby creating an unbalance force on the blade which will cause it to pivot around the pivot point. The second condition may be satisfied in any conventional manner such as by weighting the radially inner portion of the blade to insure it has a greater mass than the radially outer portion of the blade. If the weight of the blade is distributed as mentioned above, a relatively small amount of gas pressure on the large surface outward from the pivot point will flip the blade 17 in the direction opposite the rotation of the rotor until the blade pin 18 hits the end of the slot 19 where it stops with the blade in the preferred position for that direction of rotation.

As can be seen from FIG. 2, when the blades are in their operating position in which the point engages the end of the slot, the blade forms an angle of about 25° with a radius of the plate 16 through the pivot point 21 of the fan. Because the blades pivot in response to the rotation of the fan, each surface of the blades can be formed to take advantage of the best aerodynamic surface configuration at the operating position.

Although we have illustrated a fan at only one end of the rotor it would be obvious that a similar fan could be positioned at the other end of the rotor so as to have fans at both ends of the motor. Furthermore, the fan blades could be attached directly to the end ring 23 of the rotor similar to the die cast fan blades which are presently used in squirrel cage induction motors.

Figure 4:
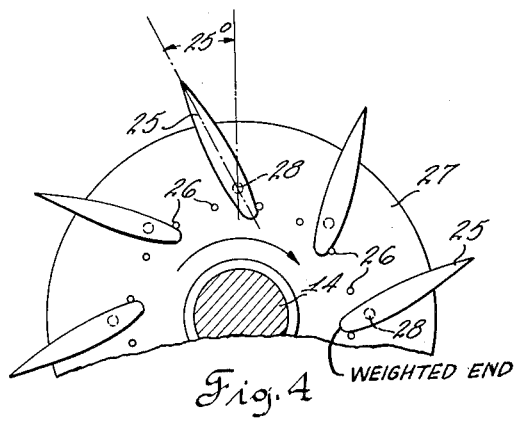
FIG. 4 is a partial end view of a fan of this invention showing an alternate mounting arrangement for the blades.

An alternate blade mounting arrangement is illustrated in FIG. 4. In this arrangement the blade 25 is pivoted a little further from the inner end of the blade and the stoppers consist of pins 26 extending outward from the backing plate 27 on either side of the portion of the blade that extends radially inward from the pivot point 28. These pins 26 are again located in such a manner as to cause the blade to form a 25° angle with a radius through the pivot point when the blade is engaging one of the stopper pins.

Figure 5:
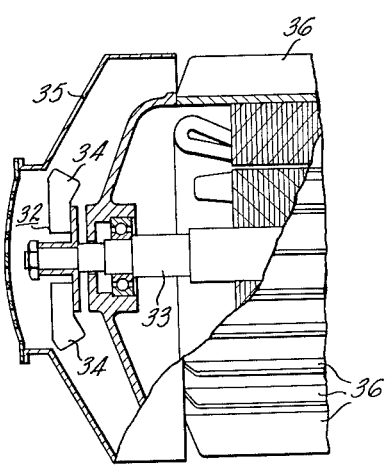
FIG. 5 is a partial end view of a fan of this invention mounted externally of a totally enclosed motor on an extension of the motor shaft.

An alternate embodiment of the invention is illustrated in FIG. 5 in which the fan 32 is mounted on an extension of the motor shaft 33 externally of the motor housing. The fan 32 has blades 34 mounted as described above in connection with FIG. 1, but positioned to blow air over the external ribbed surface 36 of the motor housing rather than over the internal windings such as in FIG. 1. Of course the fan is protected by a suitable cage 35.

The fan of this invention could be provided with plastice fan blades mounted on a backing plate close to their radially inner end. A hinge area is formed between the mounting point of the blade and its outer edge about which the outer portion of the blades can pivot. Plastics such as polypropylene are especially useful in this application because they have a virtually unlimited flex life.

In operation, as the motor begins to rotate and pick up speed, the action of the air in the motor housing on the fan blades causes them to pivot or move relative to the backing plate in a direction opposite to the direction of rotation of the fan. This relative movement continues until the blades engage the appropriately located stoppers on the backing plate. The blades will then remain in this position until the rotor slows down to a stop at which time the blades may, because of their inertia, swing over to the opposite position or move to a neutral radial position. When the motor starts up again, regardless of its direction of rotation, the process described above is repeated.

It will be apparent to those skilled in the art that various modifications and changes can be made in the fans described herein without departing from the spirit of the invention or the scope of the appended claims.

Having now particularly described and ascertained the nature of our said invention and the manner in which it is to be performed, we declare that what we claim is:

1. In an electric motor having a rotor; means for cooling said motor comprising a member mounted for rotation with said rotor, at least one blade pivotally mounted on said member, retaining means on said member positioned on either side of said blade to limit the movement of said blade in each direction relative to said member, the portion of said blade radially inward of said pivotal mount having a greater mass than the portion of said blade radially outward of said pivotal mount whereby said blade will assume a rearwardly inclined position relative to a radius of said rotor regardless of the direction of rotation of said rotor.

2. In an electric motor having a rotor; means for cooling said motor comprising a member mounted for rotation with said rotor, a plurality of blades pivotally mounted on said member, retaining means on said member positioned on either side of said blades to limit the movement of said blades in each direction relative to said member, the portion of said blades radially inward of said pivotal mount having a greater mass than the portion of said blades radially outward of said pivotal mount whereby said blades will assume a rearwardly inclined position relative to a radius of said rotor regardless of the direction of rotation of said rotor.

3. An electric motor having a rotor; means for cooling said motor comprising a backing plate mounted for rotation with said rotor, a plurality of blades pivotally mounted on said plate, said backing plate having retaining means positioned on either side of said blades to limit the movement of said blades in each direction relative to said backing plate, the portion of said blades radially inward of said pivotal mount having a greater mass than the portion of said blades radially outward of said pivotal mount whereby upon rotation of said rotor said blades will assume a rearwardly inclined position relative to said backing plate regardless of the direction of rotation.

4. An electric motor having a rotor; means for cooling said motor comprising a backing plate mounted for rotation with said rotor, a plurality of blades pivotally mounted on said plate, said backing plate having retaining means positioned on either side of said blades to limit the movement of said blades in each direction relative to said backing plate, said blades having a larger surface area on the portion of said blade that is radially outward of said pivot point, the portion of said blades radially inward of said pivotal mount having a greater mass than the portion of said blades radially outward of said pivotal mount whereby upon rotation of said rotor said blades will assume a rearwardly inclined position relative to said backing plate regardless of the direction of rotation.

5. In an electric motor having a rotor; means for cooling said motor comprising a backing plate mounted for rotation with said rotor, a plurality of blades mounted on said plate to pivot about a point intermediate their ends, said backing plate having retaining means positions on either side of said blades to limit the movement of said blades in each direction relative to said backing plate, said blades having a larger surface area on the portion of said blade that is radially outward of said pivot point, said blades being formed so that the portion radially inward of said pivot point has a greater centrifugal force effect than the portion of the blade radially outward from said pivot point whereby said blades will assume a rearwardly inclined position relative to said backing plate regardless of the direction of rotation of said rotor.

References Cited by the Examiner

UNITED STATES PATENTS

| | | | |
|---|---|---|---|
| 1,628,086 | 5/27 | Warner | 310—63 |
| 2,913,604 | 11/59 | Lessmann | 310—6 |

FOREIGN PATENTS

| | | |
|---|---|---|
| 172,741 | 6/06 | Germany. |
| 662,032 | 7/38 | Germany. |

MILTON O. HIRSHFIELD, *Primary Examiner.*

DAVID X. SLINEY, *Examiner.*